(12) United States Patent
Takeuchi

(10) Patent No.: US 11,515,090 B2
(45) Date of Patent: Nov. 29, 2022

(54) CERAMIC ELECTRONIC COMPONENT AND METHOD FOR MANUFACTURING CERAMIC ELECTRONIC COMPONENT

(71) Applicant: Murata Manufacturing Co., Ltd., Nagaokakyo (JP)

(72) Inventor: Shunsuke Takeuchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/241,123

(22) Filed: Apr. 27, 2021

(65) Prior Publication Data
US 2021/0343475 A1 Nov. 4, 2021

(30) Foreign Application Priority Data
May 1, 2020 (JP) .............................. JP2020-081566

(51) Int. Cl.
*H01G 4/012* (2006.01)
*H01G 4/30* (2006.01)
*H01G 4/12* (2006.01)
*H01G 2/02* (2006.01)
*C04B 35/462* (2006.01)
*H01G 4/008* (2006.01)

(52) U.S. Cl.
CPC .......... *H01G 4/012* (2013.01); *C04B 35/462* (2013.01); *H01G 2/02* (2013.01); *H01G 4/008* (2013.01); *H01G 4/1209* (2013.01); *H01G 4/30* (2013.01); *C04B 2235/65* (2013.01)

(58) Field of Classification Search
CPC .... C04B 35/462; C04B 2235/65; H01G 2/02; H01G 4/008; H01G 4/1209
See application file for complete search history.

(56) References Cited

U.S. PATENT DOCUMENTS

| 9,812,258 | B2* | 11/2017 | Omori | .................... H01G 4/232 |
| 10,312,022 | B2* | 6/2019 | Lee | ....................... H01G 4/2325 |
| 2017/0018361 | A1* | 1/2017 | Nishisaka | ............ H01G 4/2325 |
| 2020/0152387 | A1* | 5/2020 | Takeuchi | ............. H01G 4/1245 |

FOREIGN PATENT DOCUMENTS

JP 2005-217128 A 8/2005

* cited by examiner

*Primary Examiner* — Nathan Milakovich
(74) *Attorney, Agent, or Firm* — Keating & Bennett, LLP

(57) ABSTRACT

A ceramic electronic component includes a ceramic body and an external electrode including an end surface region on an end surface of the ceramic body and a side surface region on a side surface of the ceramic body. The side surface region includes a first end portion electrically connected to the end surface region, and a second end portion opposite to the first end portion. At at least a portion where an internal electrode is led out, the end surface region includes a high glass content layer in contact with the ceramic body. At least the second end portion and a vicinity thereof includes a low glass content layer in contact with the ceramic body. At least a portion of the side surface region includes a surface with the low glass content layer exposed.

20 Claims, 10 Drawing Sheets

CERAMIC ELECTRONIC COMPONENT AND METHOD FOR MANUFACTURING CERAMIC ELECTRONIC COMPONENT

CROSS REFERENCE TO RELATED APPLICATIONS

This application claims the benefit of priority to Japanese Patent Application No. 2020-081566 filed on May 1, 2020. The entire contents of this application are hereby incorporated herein by reference.

BACKGROUND OF THE INVENTION

1. Field of the Invention

The present invention relates to a ceramic electronic component including a ceramic body and an external electrode on a surface of the ceramic body, and to a method for manufacturing a ceramic electronic component suitable to manufacture the ceramic electronic component of the present invention.

2. Description of the Related Art

When a ceramic electronic component including a ceramic body and an external electrode on a surface of the ceramic body is soldered to and thus mounted on a substrate, and the substrate is warped, flexed or the like, the ceramic body may have a cracked side surface. That is, in mounting by soldering, a land electrode of the substrate and the external electrode of the ceramic electronic component are firmly soldered together, and when the substrate is warped, flexed or the like and stress is caused, the stress is not released anywhere, and instead is transmitted to the ceramic body, and the ceramic body may have a side surface cracked.

To address this issue, a ceramic electronic component is disclosed in Japanese Patent Laid-Open No. 2005-217128. In Japanese Patent Laid-Open No. 2005-217128, it is assumed that a ceramic body cracks due to glass added to an external electrode in order to improve bonding strength, and a large amount of glass is diffused in a region of the ceramic body where the external electrode is provided, whereas no glass is diffused in a region of the ceramic body where the external electrode is not provided. Therefore, the ceramic body has a difference in stress at a boundary between the region with the external electrode and the region without the external electrode, and the boundary is thus more likely to crack.

More specifically, when a ceramic electronic component including a pair of external electrodes is cut and observed in a cross section including the pair of external electrodes, the external electrode typically has a U shape and includes an end surface region on an end surface of the ceramic body and a side surface region on a side surface of the ceramic body. When the external electrode has glass added thereto, a region in which a large amount of glass is diffused and a region in which glass is not diffused are formed in the ceramic body at a terminal portion of the side surface region of the external electrode. Therefore, a difference in stress is caused at a boundary between the region where the large amount of glass is diffused and the region where glass is not diffused, and the boundary is thus more likely to crack. Note that in Japanese Patent Laid-Open No. 2005-217128, the side surface of the ceramic body provided with the side surface region of the external electrode is referred to as a "major surface."

Accordingly, in the ceramic electronic component of Japanese Patent Laid-Open No. 2005-217128, the external electrode includes the end surface region formed of a layer having a high glass content, and the side surface region formed of two layers of a lower layer having a low glass content and an upper layer formed on the lower layer and having a high glass content. That is, a layer having a high glass content is not directly formed on the side surface of the ceramic body, and instead, initially, a lower layer having a low glass content is formed, and an upper layer having a high glass content is formed thereon, so that the ceramic body does not have a side surface including a region with glass diffused therein, and the side surface of the ceramic body is unlikely to be cracked even when a substrate having the ceramic electronic component mounted thereon is warped, flexed or the like. That is, the boundary between the region with a large amount of glass diffused therein and the region with no glass diffused therein is not located in the side surface of the ceramic body, so that the side surface of the ceramic body is unlikely to be cracked even when the substrate having the ceramic electronic component mounted thereon is warped, flexed or the like.

The ceramic electronic component of Japanese Patent Laid-Open No. 2005-217128 includes an external electrode having a side surface region entirely formed of two layers including a lower layer having a low glass content and an upper layer having a high glass content, and thus has a surface with the high glass content layer exposed. Furthermore, although the external electrode typically has a surface electrolytically plated to provide a plating layer formed thereon, the external electrode, having the surface with the high glass content layer exposed, prevents the plating layer from being formed on the glassy portion. The portion that does not have the plating layer formed thereon would have low solder wettability.

SUMMARY OF THE INVENTION

A ceramic electronic component according to a preferred embodiment of the present invention includes a ceramic body including a ceramic layer and an internal electrode stacked in layers, and at least a pair of external electrodes on a surface of the ceramic body. The internal electrode and the external electrode are electrically interconnected. The ceramic body includes a pair of end surfaces at which the internal electrode is led out, and four side surfaces connecting the pair of end surfaces. The external electrode includes at least a high glass content layer including glass and a low glass content layer including no glass or including glass at a ratio smaller than the high glass content layer. In at least one of a cross section including the pair of external electrodes that is obtained by cutting in a direction perpendicular or substantially perpendicular to a direction of a plane in which the internal electrode extends and a cross section including the pair of external electrodes that is obtained by cutting in a direction parallel or substantially parallel to the direction of the plane in which the internal electrode extends, the external electrode includes an end surface region on the end surface and a side surface region on the side surface. The side surface region includes a first end portion electrically connected to the end surface region at a ridge portion of the ceramic body connecting the end surface and the side surface together, and a second end portion opposite to the first end portion. The end surface region includes the high glass content layer in contact with the ceramic body. At least at a portion where the internal electrode is led out, at least the second end portion and a vicinity thereof includes the low glass content layer in contact with the ceramic body. At least a portion of the side surface region including a surface with the low glass content layer exposed.

A method for manufacturing a ceramic electronic component according to a preferred embodiment of the present invention including a ceramic body including a ceramic layer and an internal electrode stacked in layers, and at least a pair of external electrodes on a surface of the ceramic body, wherein the internal electrode and the external electrode are electrically interconnected, the ceramic body includes a pair of end surfaces at which the internal electrode is led out, and four side surfaces connecting the pair of end surfaces, the external electrode includes at least a high glass content layer including glass and a low glass content layer including no glass or including glass at a ratio smaller than the high glass content layer, in at least one of a cross section including the pair of external electrodes that is obtained by cutting in a direction perpendicular or substantially perpendicular to a direction of a plane in which the internal electrode extends and a cross section including the pair of external electrodes that is obtained by cutting in a direction parallel to the direction of the plane in which the internal electrode extends, the external electrode includes an end surface region on the end surface and a side surface region on the side surface, the side surface region includes a first end portion electrically connected to the end surface region at a ridge portion of the ceramic body connecting the end surface and the side surface together, and a second end portion opposite to the first end portion, the end surface region includes the high glass content layer in contact with the ceramic body, at least at a portion where the internal electrode is led out, and at least the second end portion and a vicinity thereof includes the low glass content layer in contact with the ceramic body, the method including preparing a plurality of ceramic green sheets; applying a first conductive paste to a major surface of at least one ceramic green sheet; stacking a plurality of ceramic green sheets in layers to prepare a green ceramic body; firing the green ceramic body to prepare a ceramic body including the ceramic layer and the internal electrode stacked in layers; and applying second and third conductive pastes to a surface of the fired ceramic body and baking the second and third conductive pastes on the surface of the ceramic body to form the external electrode.

Ceramic electronic components according to preferred embodiments of the present invention each include an external electrode including a side surface region with at least a portion thereof including a surface with a low glass content layer exposed, and at that portion, the external electrode includes the side surface region with higher platability or larger plating strength and, thus, higher solder wettability than a high glass content layer.

Further, methods for manufacturing ceramic electronic components according to preferred embodiments of the present invention each facilitate manufacturing ceramic electronic components according to preferred embodiments of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be described with reference to preferred embodiments and the drawings.

Each preferred embodiment shows a preferred embodiment of the present invention exemplarily, and the present invention is not limited to the contents of the preferred embodiments. Moreover, it is also possible to combine the contents described in different preferred embodiments, and the contents thereof are also included in the present invention. Further, the drawings are intended to facilitate understanding the specification and may be schematically shown, and the component dimensional ratios or dimensional ratios between the components may not match those described in the specification. In addition, some of components described in the specification may not be shown in a figure or may be drawn differently in number.

In the preferred embodiments, ceramic capacitors will be described as examples of the ceramic electronic component. Note, however, that the ceramic electronic components according to preferred embodiments of the present invention may be of any suitable type, and are not limited to ceramic capacitors.

First Preferred Embodiment

Figure 1A:
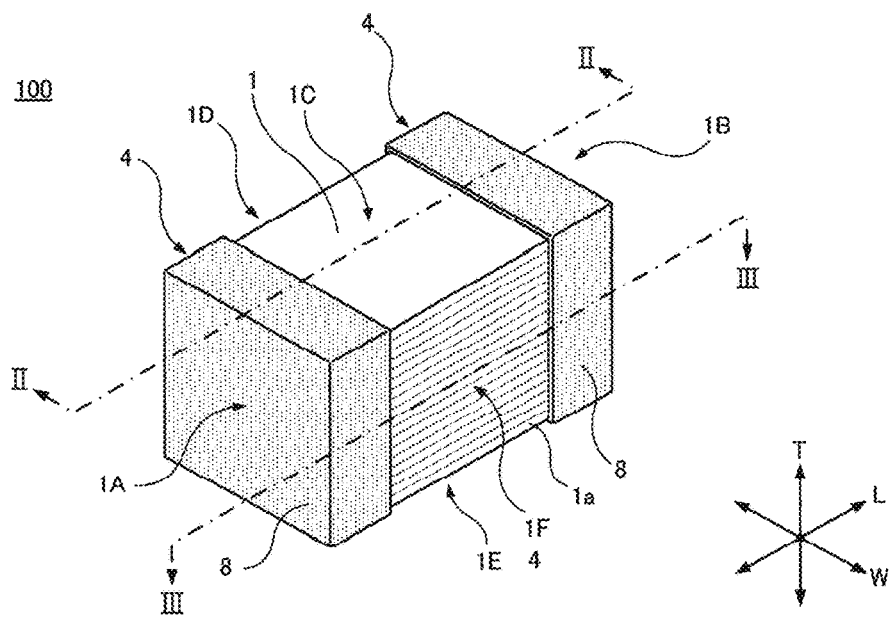
FIG. 1A is a perspective view of a ceramic capacitor 100 according to a preferred embodiment of the present invention.
Figure 1B:
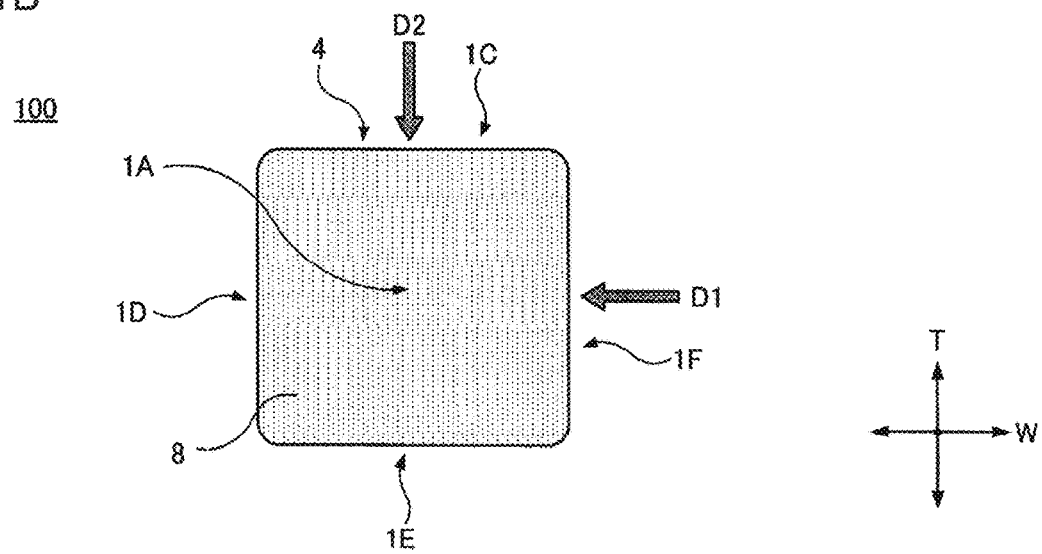
FIG. 1B is a front view of ceramic capacitor 100.
Figure 1C:
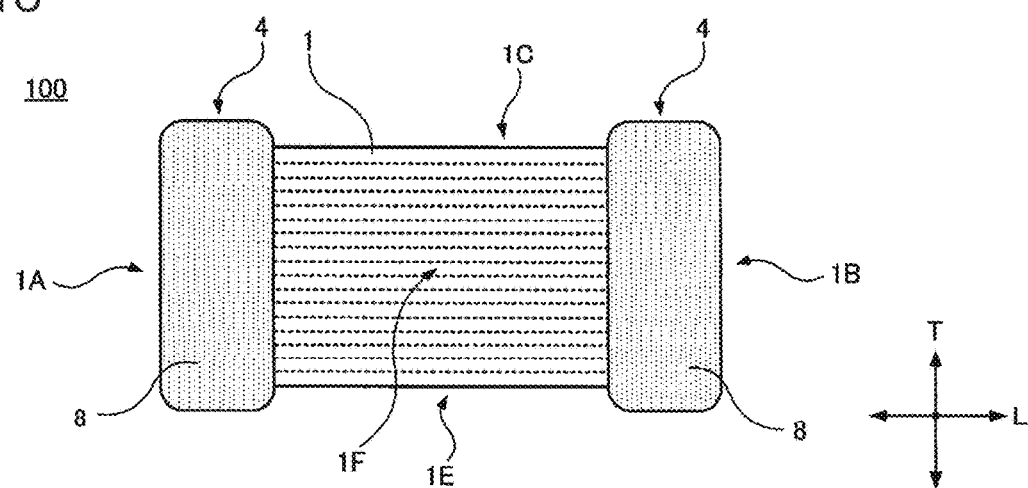
FIG. 1C is a side view of ceramic capacitor 100.
Figure 2:
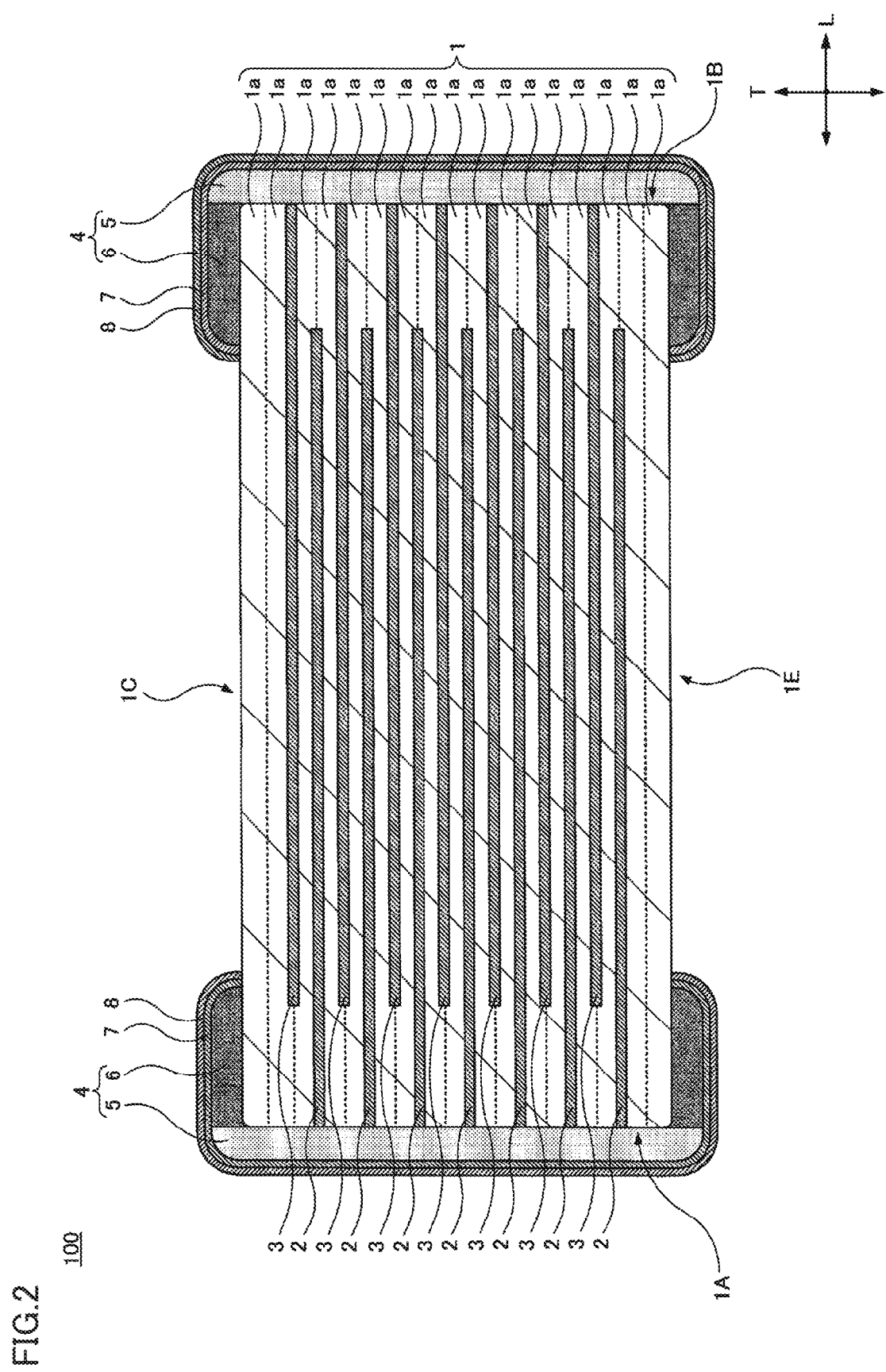
FIG. 2 is a cross section of ceramic capacitor 100, showing a portion indicated in FIG. 1A by a dashed-dotted arrow II-II.
Figure 3:
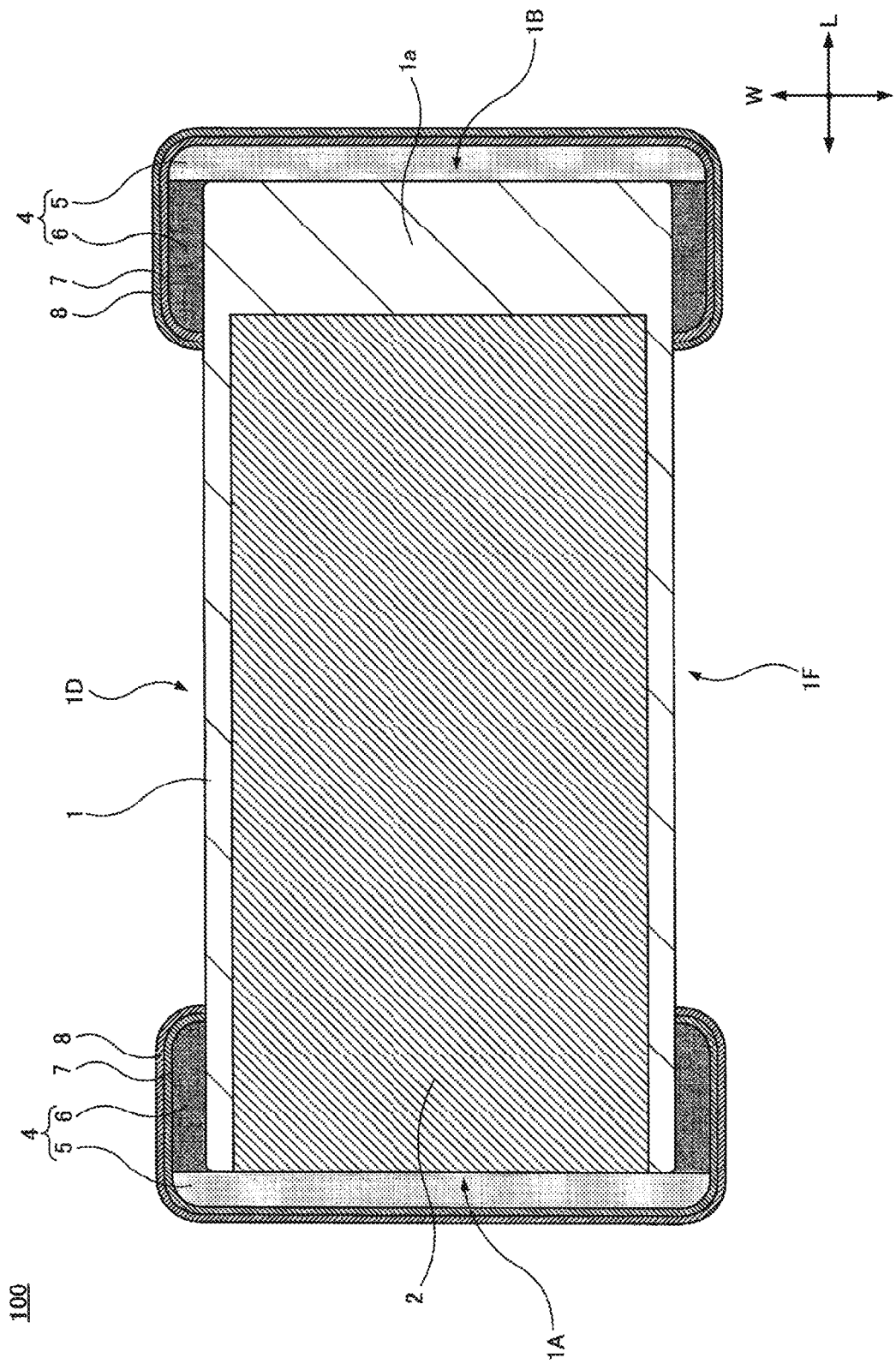
FIG. 3 is a cross section of ceramic capacitor 100, showing a portion indicated in FIG. 1A by a dashed-dotted arrow III-III.
Figure 4:
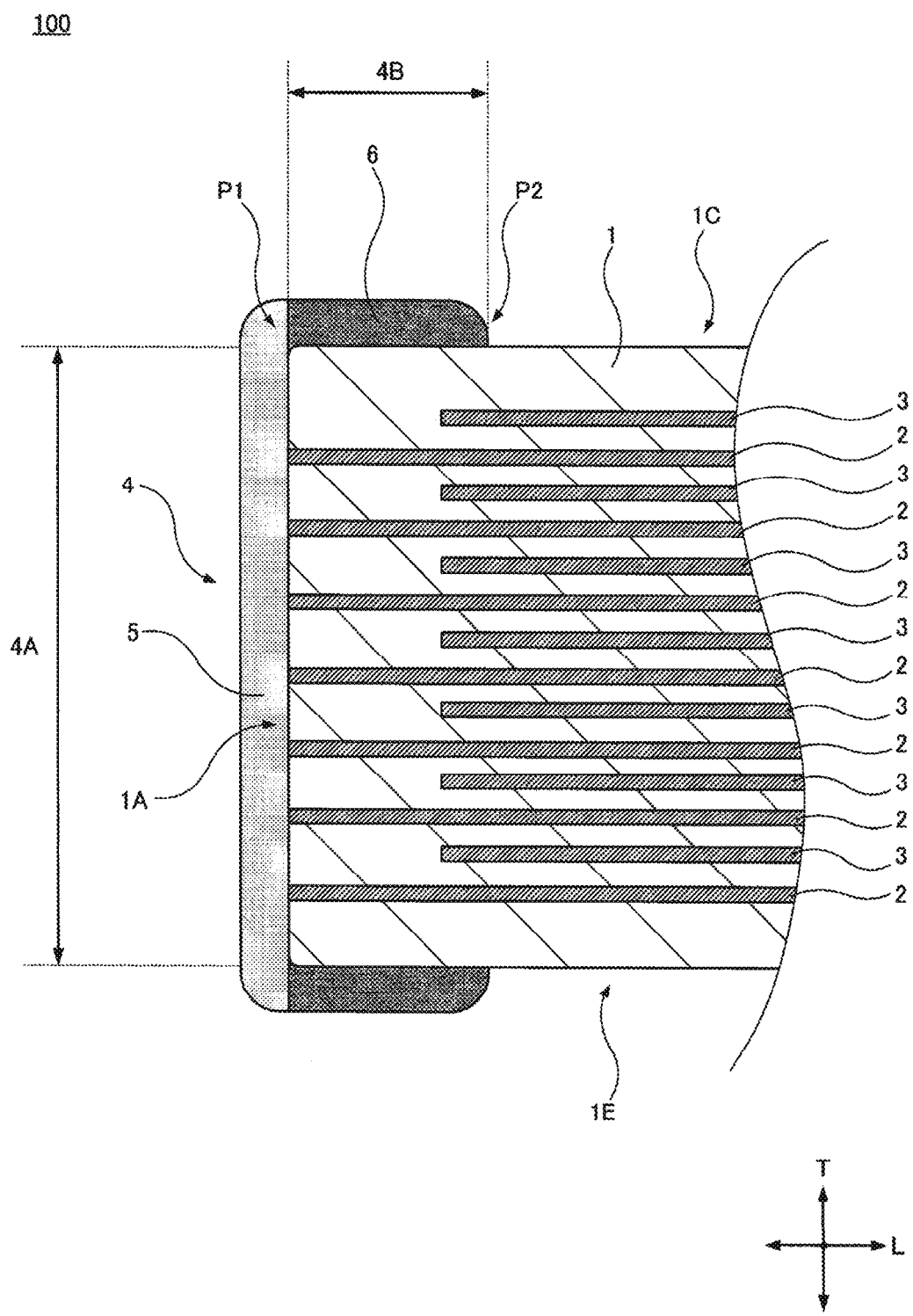
FIG. 4 is a cross section of a portion of ceramic capacitor 100.

FIGS. 1A to 4 show a ceramic capacitor 100 as a ceramic electronic component according to a first preferred embodiment of the present invention. FIG. 1A is a perspective view of ceramic capacitor 100. FIG. 1B is a front view of ceramic capacitor 100. FIG. 1C is a side view of ceramic capacitor 100. FIG. 2 is a cross section of ceramic capacitor 100 taken along a dashed-dotted arrow II-II indicated in FIG. 1A. That is, FIG. 2 is a cross section of ceramic capacitor 100 including a pair of external electrodes 4 described hereinafter, and cut in a direction perpendicular or substantially perpendicular to a direction of a plane in which internal electrodes 2, 3 described hereinafter extend, and it is a cross section of ceramic capacitor 100 as viewed in a direction indicated in FIG. 1B by an arrow D1. FIG. 3 is also a cross section of ceramic capacitor 100 and shows a portion indicated in FIG. 1A by a dashed-dotted arrow III-III. That is, FIG. 3 is a cross section of ceramic capacitor 100 including the pair of external electrodes 4 described hereinafter, and cut in a direction parallel or substantially parallel to the direction of the plane in which internal electrodes 2, 3 described hereinafter extend, and it is a cross section of ceramic capacitor 100 viewed in a direction indicated in FIG. 1B by an arrow D2. FIG. 4 is a cross section of a portion of ceramic capacitor 100, showing a portion of FIG. 2 in an enlarged manner.

The drawings indicate a heightwise direction T, a lengthwise direction L, and a widthwise direction W of ceramic capacitor 100, and these directions may be referred to in the following description. Note that in the present preferred embodiment, a direction in which ceramic layer 1a and internal electrodes 2 and 3 described hereinafter are stacked is defined as heightwise direction T of ceramic capacitor 100.

Ceramic capacitor 100 includes a ceramic body 1 including a plurality of ceramic layers 1a and a plurality of internal electrodes 2, 3 stacked in layers. Ceramic body 1 has a rectangular or substantially rectangular parallelepiped shape. That is, ceramic body 1 includes a pair of end surfaces 1A and 1B, and four side surfaces 1C, 1D, 1E, and 1F connecting the pair of end surfaces 1A and 1B. Note that the rectangular or substantially rectangular parallelepiped shape, when based on a geometrical rectangular or substantially parallel parallelepiped shape, includes a corner having a rounded shape based on a design for stress relaxation/prevention, variation in geometry due to a manufacturing process including firing and polishing, and the like, required to manufacture an actual component.

Ceramic body 1 and ceramic layer 1a may be made of any suitable material, and for example, a dielectric ceramic material including $BaTiO_3$ as a major component can preferably be used. $BaTiO_3$ may be replaced with, for example, $CaTiO_3$, $SrTiO_3$, $CaZrO_3$ or a like material as a major component of the dielectric ceramic material. While ceramic layer 1a may have any suitable thickness, it may, for example, preferably be about 0.3 μm to about 3.0 μm.

Internal electrodes 2 and 3 may include any suitable type of metal as a major component, and it can, for example, preferably be Ni. Ni may be replaced with other metals such as, for example, Cu, Ag, Pd and Au. Further, for example, Ni, Cu, Ag, Pd, Au, and the like may be alloyed with another metal. While internal electrodes 2, 3 may have any thickness, it may, for example, preferably be about 0.1 μm to about 2.0 μm. It is also preferable to add a ceramic material having the same composition as that of ceramic body 1 (or ceramic layer 1a) to internal electrodes 2, 3.

A plurality of internal electrodes 2 are led out to one end surface 1A of ceramic body 1. A plurality of internal electrodes 3 are led out to the other end surface 1B of ceramic body 1.

External electrodes 4 are provided on end surfaces 1A and 1B, respectively, of ceramic body 1. Internal electrode 2 is electrically connected to external electrode 4 on end surface 1A. Internal electrode 3 is electrically connected to external electrode 4 on end surface 1B.

External electrode 4 includes at least a high glass content layer 5 having a high glass content ratio and a low glass content layer 6 free of glass or having a glass content ratio lower than that of high glass content layer 5. While high and low glass content layers 5 and 6 may have any suitable glass content, low glass content layer 6 may have a glass content of about 0% by volume or more and less than about 20% by volume and high glass content layer 5 may have a glass content of about 20% by volume or more, for example. Alternatively, low glass content layer 6 may have a glass content of about 0% by volume or more and less than about 25% by volume, and high glass content layer 5 may have a glass content of about 25% by volume or more, for example. It is also preferable that high glass content layer 5 have a glass content larger by about 10% by volume or more than low glass content layer 6, for example. In this case, high glass content layer 5 can be firmly bonded to ceramic body 1.

External electrode 4 may include any suitable type of metal as a major component, and it may preferably be, for example, Cu. Cu may be replaced with a different type of metal such as, for example, Ni, Ag, Pd, Au or the like. Further, for example, Cu, Ni, Ag, Pd, Au, or the like may be alloyed with another metal. High glass content layer 5 and low glass content layer 6 may include different types of metal as a major component.

In the present preferred embodiment, external electrode 4 is configured in the shape of a cap at each of opposite ends of ceramic body 1. As a result, as shown in FIG. 4, external electrode 4 includes an end surface region 4A on end surface 1A (1B) and a side surface region 4B on side surfaces 1C, 1E (1D, 1F). Side surface region 4B may be referred to as a "folded-back portion" of external electrode 4.

Side surface region 4B includes a first end portion P1 electrically connected to end surface region 4A at a ridge portion of ceramic body 1 connecting end surface 1A (1B) and side surface 1C (1E, 1D, 1F), and a second end portion P2 opposite to first end portion P1.

In the present preferred embodiment, external electrode 4 includes end surface region 4A including a single high glass content layer 5, and side surface region 4B includes a single low glass content layer 6.

While in the present preferred embodiment, external electrode 4 is provided on one end surface and four side surfaces so as to be cap shaped, alternatively, external electrode 4 may be provided on one end surface and two opposite side surfaces so as to have a U shape or on one end surface and one side surface so as to have an L shape.

In the present preferred embodiment, two plating layers including a Ni plating layer 7 and a Sn plating layer 8 are provided on external electrode 4. Ni plating layer 7 is mainly provided to improve heat resistance and improve bonding strength. Sn plating layer 8 is mainly provided to improve solderability. Any suitable type of plating layer may be provided in any suitable number, as appropriate.

As can be seen from FIG. 2 showing a cross section taken in a direction perpendicular or substantially perpendicular to the direction of a plane in which internal electrodes 2 and 3 extend, FIG. 3 showing a cross section taken in a direction parallel or substantially parallel to the direction of the plane in which internal electrodes 2 and 3 extend, and FIG. 4 showing a cross section of a portion of FIG. 2 that is enlarged, ceramic capacitor (ceramic electronic component) 100 according to the present preferred embodiment has the following advantageous features.

Ceramic capacitor 100 according to the present preferred embodiment includes external electrode 4 including side surface region 4B including low glass content layer 6, and when it is soldered and mounted on a substrate, and the substrate is warped, flexed or the like, low glass content layer 6 can peel off ceramic body 1 to relax stress and thus reduce cracking in side surfaces 1C, 1D, 1E, and 1F of ceramic body 1. While cracking in ceramic body 1 may allow intrusion of moisture, external electrode 4 including side surface region 4B only partially peeled off ceramic body 1 does not cause a serious problem.

In addition, ceramic capacitor 100 includes internal electrodes 2 and 3 led out in end surface region 4A of external electrode 4 that includes high glass content layer 5, and the ceramic capacitor is thus resistant to intrusion of moisture and thus has high moisture resistance.

Further, ceramic capacitor 100 includes external electrode 4 including side surface region 4B with low glass content layer 6 exposed, and thus includes side surface region 4B with high platability and high solder wettability.

Ceramic capacitor (ceramic electronic component) 100 according to the present preferred embodiment having the above structure can be manufactured for example in the following non-limiting method.

Initially, ceramic body 1 is manufactured. Specifically, initially, a powdery dielectric ceramic material, a binder resin, a solvent, and the like are prepared and wet-mixed to prepare a ceramic slurry.

Subsequently, the ceramic slurry is applied on an upper surface of a carrier film having a sheet shape using a die coater, a gravure coater, a micro gravure coater, or the like, for example, and dried to prepare a ceramic green sheet. Instead of the coater, a doctor blade or the like, for example, may be used to prepare the ceramic green sheet.

Subsequently, in order to form internal electrodes 2, 3 on a major surface of a predetermined ceramic green sheet, a previously prepared, first conductive paste is applied (e.g., printed) in a desired pattern. Note that the first conductive paste is not applied to a ceramic green sheet that will define and function as an outer layer. The first conductive paste can, for example, be a mixture of a solvent, a binder resin, a powdery metal (e. g., powdery Ni) and the like.

Subsequently, a plurality of such ceramic green sheets are stacked in a predetermined order and integrated by thermal compression bonding to prepare a green ceramic body. When the produced green ceramic body is a mother green ceramic body including a plurality of green ceramic bodies, it is also preferable to divide the mother green ceramic body into individual green ceramic bodies at this stage.

Subsequently, the green ceramic body is fired in a predetermined profile to complete ceramic body 1. It is also preferable that, prior to firing, a debinding treatment is performed to eliminate or reduce the binder resin included in the green ceramic body. By firing the green ceramic body, the ceramic green sheet is fired to be ceramic layer 1a, and the first conductive paste applied to the major surface of the ceramic green sheet is simultaneously fired to be internal electrodes 2 and 3.

Subsequently, a third conductive paste, which will be low glass content layer 6 after firing, is applied to an end portion of ceramic body 1 in the shape of a cap. Specifically, for example, ceramic body 1 includes end surfaces 1A and 1B deeply immersed in a bath accommodating the third conductive paste therein. As a result, the third conductive paste that will be low glass content layer 6 after firing is applied to end surface regions 4A and 4B in the shape of a cap. As the third conductive paste a paste is used which includes a powdery metal (e. g., powdery Cu), a solvent, a binder resin and the like, for example, and does not include glass frit, or such a paste with glass frit added only in a slight amount. When the third conductive paste with glass frit added thereto is used, it includes glass frit added in an amount smaller than that added to a second conductive paste described hereinafter.

Subsequently, the third conductive paste that will be low glass content layer 6 after firing is scraped off end surface region 4A. In contrast, the third conductive paste is not removed from side surface region 4B, and the third conductive paste is left as it is applied. Then, if necessary, the third conductive paste remaining in side surface region 4B is dried. The third conductive paste may be dried before a subsequent baking step when the second conductive paste applied to end surface region 4A is dried. In contrast, the third conductive paste may be dried at this stage and furthermore, baked on ceramic body 1.

Subsequently, the second conductive paste that will be high glass content layer 5 after firing is applied to end surface region 4A. Specifically, for example, ceramic body 1 includes end surfaces 1A and 1B shallowly immersed in a bath accommodating the second conductive paste therein. As a result, the second conductive paste is applied to end surface region 4A. The second conductive paste includes a powdery metal, a solvent, a binder resin and the like, for example, added thereto, and in addition, glass frit added in an amount larger than that added to the third conductive paste.

Subsequently, the second conductive paste applied to end surface region 4A is dried. Subsequently, the second and third conductive pastes are fired to bake to ceramic body 1 external electrode 4 including high and low glass content layers 5 and 6.

Subsequently, Ni plating layer 7 is formed on a surface of external electrode 4 by electrolytic plating, for example. Subsequently, Sn plating layer 8 is similarly formed on a surface of Ni plating layer 7 by electrolytic plating, for example. Thus, ceramic capacitor (ceramic electronic component) 100 according to the present preferred embodiment is obtained.

Second Preferred Embodiment

Figure 5:
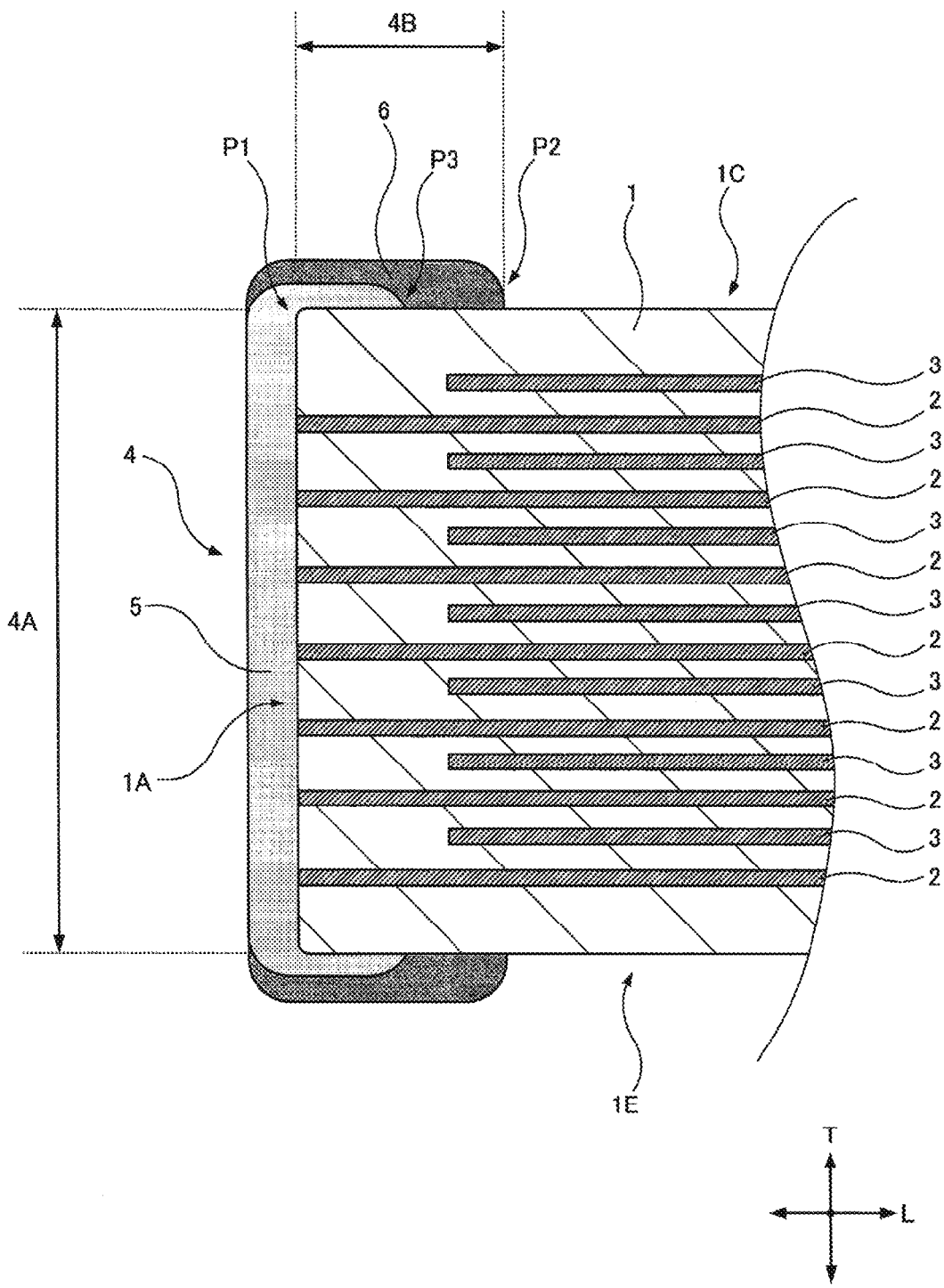
FIG. 5 is a cross section of a portion of a ceramic capacitor 200 according to a preferred embodiment of the present invention.

FIG. 5 shows a ceramic capacitor 200 as a ceramic electronic component according to a second preferred embodiment of the present invention. FIG. 5 is a cross section of a portion of ceramic capacitor 200. FIG. 5 does not show Ni and Sn plating layers 7 and 8 on external electrode 4.

Ceramic capacitor 200 includes external electrode 4 such that end surface region 4A includes a single layer of high glass content layer 5, side surface region 4B from first end portion P1 to an intermediate point P3 includes two layers of a lower layer of high glass content layer 5 and an upper layer of low glass content layer 6, and side surface region 4B from intermediate point P3 to second end portion P2 includes a single layer of low glass content layer 6.

Ceramic capacitor 200 can include external electrode 4 formed, for example, in the following non-limiting example method. Initially, the second conductive paste is applied to an end portion of ceramic body 1 in the shape of a cap and dried. Subsequently, the third conductive paste is annularly applied to a side surface of ceramic body 1 including an upper surface of the applied and dried second conductive paste, and is dried. Subsequently, the second and third conductive pastes are baked to ceramic body 1. Thus, external electrode 4 is formed.

Ceramic capacitor 200 includes external electrode 4 including side surface region 4B with second end portion P2 and a vicinity thereof made of low glass content layer 6, and even when a substrate that with the ceramic capacitor mounted thereon is warped, flexed or the like, low glass content layer 6 is peeled off ceramic body 1 and thus relaxes stress, and side surfaces 1C, 1D, 1E, 1F of ceramic body 1 are less likely to be cracked. In addition, ceramic capacitor 200 includes internal electrodes 2 and 3 led out in end surface region 4A of external electrode 4 that includes high glass content layer 5, and the ceramic capacitor is thus resistant to intrusion of moisture and has high moisture resistance. Further, ceramic capacitor 200 includes external electrode 4 including side surface region 4B with low glass content layer 6 exposed, and thus includes side surface region 4B with high platability and high solder wettability.

Third Preferred Embodiment

Figure 6:
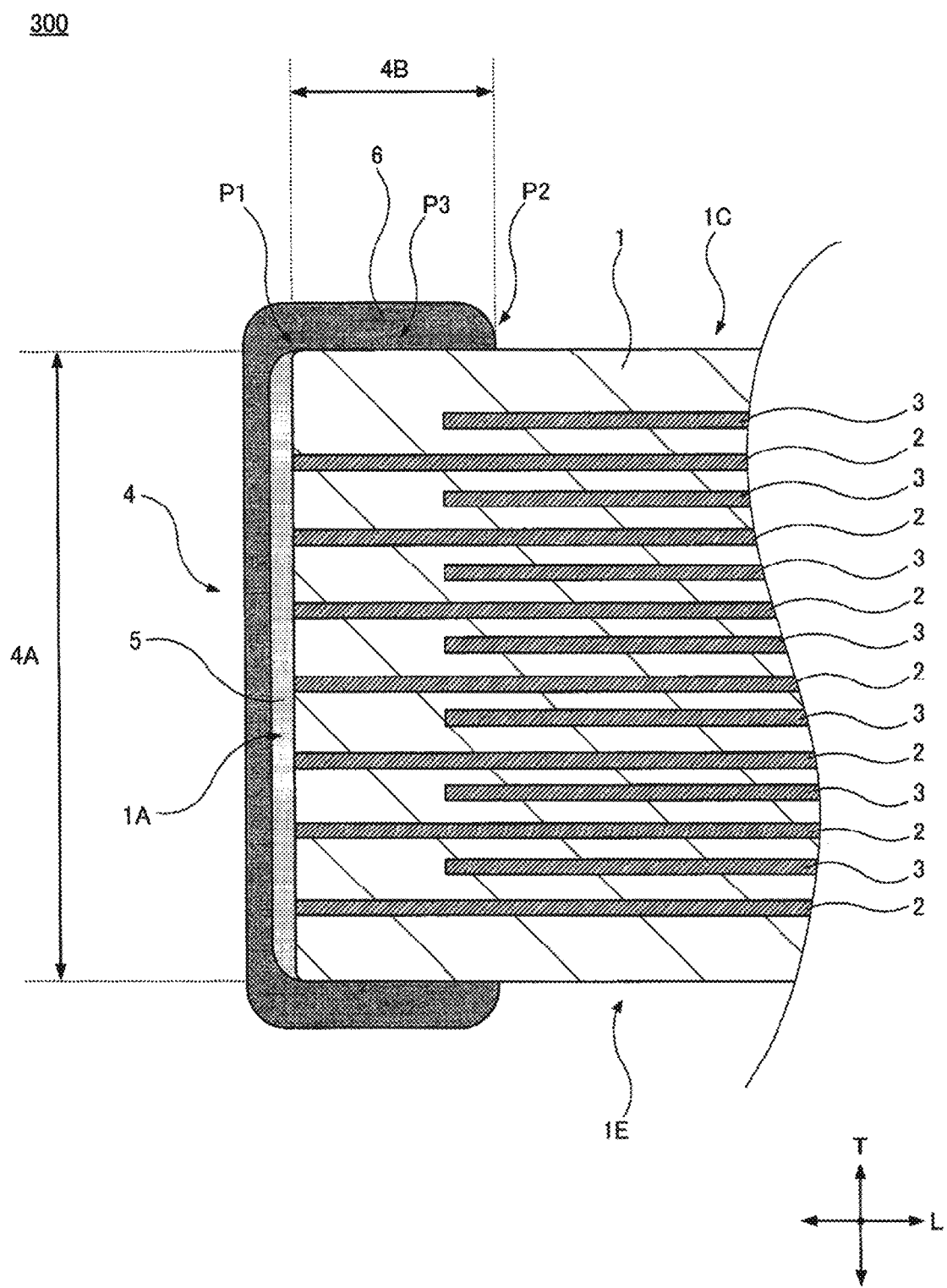
FIG. 6 is a cross section of a portion of a ceramic capacitor 300 according to a preferred embodiment of the present invention.

FIG. 6 shows a ceramic capacitor 300 as a ceramic electronic component according to a third preferred embodiment of the present invention. FIG. 6 is a cross section of a portion of ceramic capacitor 300. FIG. 6 does not show Ni and Sn plating layers 7 and 8 on external electrode 4.

Ceramic capacitor 300 includes external electrode 4 including end surface region 4A that includes two layers of a lower layer of high glass content layer 5 and an upper layer of low glass content layer 6, and side surface region 4B that includes a single layer of low glass content layer 6.

Ceramic capacitor 300 can include external electrode 4 formed, for example, in the following non-limiting example method. Initially, the second conductive paste is applied to end surface 1A (1B) of ceramic body 1 and dried. Subsequently, the third conductive paste is applied in the shape of a cap to an end portion of ceramic body 1 including an upper surface of the applied and dried second conductive paste, and is dried. Subsequently, the second and third conductive pastes are baked to ceramic body 1. Thus, external electrode 4 is formed.

Ceramic capacitor 300 includes external electrode 4 including side surface region 4B that includes low glass content layer 6, and even when a substrate with the ceramic capacitor mounted thereon is warped, flexed or the like, low glass content layer 6 is peeled off ceramic body 1 and thus relaxes stress, and side surfaces 1C, 1D, 1E, 1F of ceramic layer 1 are less likely to be cracked. In addition, ceramic capacitor 300 includes internal electrodes 2 and 3 led out in end surface region 4A of external electrode 4 including a lower layer that is made of high glass content layer 5, and the ceramic capacitor is thus resistant to intrusion of moisture and has high moisture resistance. Further, ceramic capacitor 300 includes external electrode 4 including side surface region 4B that is made of low glass content layer 6, and thus has high platability and high solder wettability.

Fourth Preferred Embodiment

Figure 7:
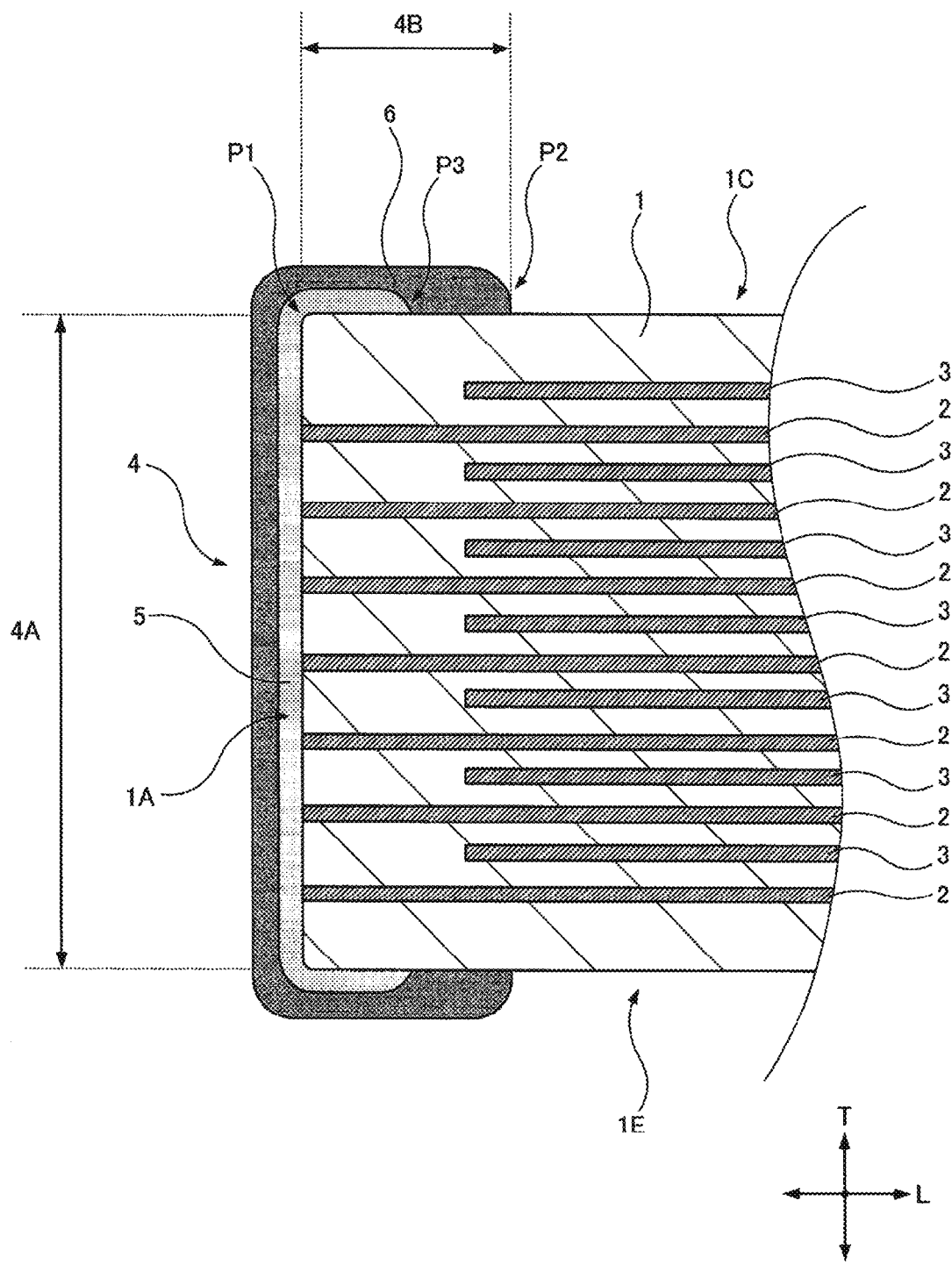
FIG. 7 is a cross section of a portion of a ceramic capacitor 400 according to a preferred embodiment of the present invention.

FIG. 7 shows a ceramic capacitor 400 as a ceramic electronic component according to a fourth preferred embodiment of the present invention. FIG. 7 is a cross section of a portion of ceramic capacitor 400. FIG. 7 does not show Ni and Sn plating layers 7 and 8 on external electrode 4.

Ceramic capacitor 400 includes external electrode 4 such that end surface region 4A includes two layers including a lower layer of high glass content layer 5 and an upper layer of low glass content layer 6, side surface region 4B from first end portion P1 to intermediate point P3 includes two layers including a lower layer of high glass content layer 5 and an upper layer of low glass content layer 6, and side surface region 4B from intermediate point P3 to second end portion P2 includes a single layer of low glass content layer 6.

Ceramic capacitor 400 can include external electrode 4 formed, for example, in the following non-limiting example method: Initially, the second conductive paste is applied to an end portion of ceramic body 1 in the shape of a cap and dried. Subsequently, the third conductive paste is applied in the shape of a cap to the end portion of ceramic body 1 including an upper surface of the applied and dried second conductive paste, and is dried. Subsequently, the second and third conductive pastes are baked to ceramic body 1. Thus, external electrode 4 is formed.

Ceramic capacitor 400 includes external electrode 4 including side surface region 4B with second end portion P2 and a vicinity thereof including low glass content layer 6, and even when a substrate with the ceramic capacitor mounted thereon is warped, flexed or the like, low glass content layer 6 is peeled off ceramic body 1 and thus relaxes stress, and side surfaces 1C, 1D, 1E, 1F of ceramic body 1 are less likely to be cracked. In addition, ceramic capacitor 400 includes internal electrodes 2 and led out in end surface region 4A of external electrode 4 including a lower layer that is made of high glass content layer 5, and the ceramic capacitor is thus resistant to intrusion of moisture and has high moisture resistance. Further, ceramic capacitor 400 includes external electrode 4 including side surface region 4B with low glass content layer 6 exposed, and thus includes side surface region 4B with high platability and high solder wettability.

Fifth Preferred Embodiment

Figure 8:
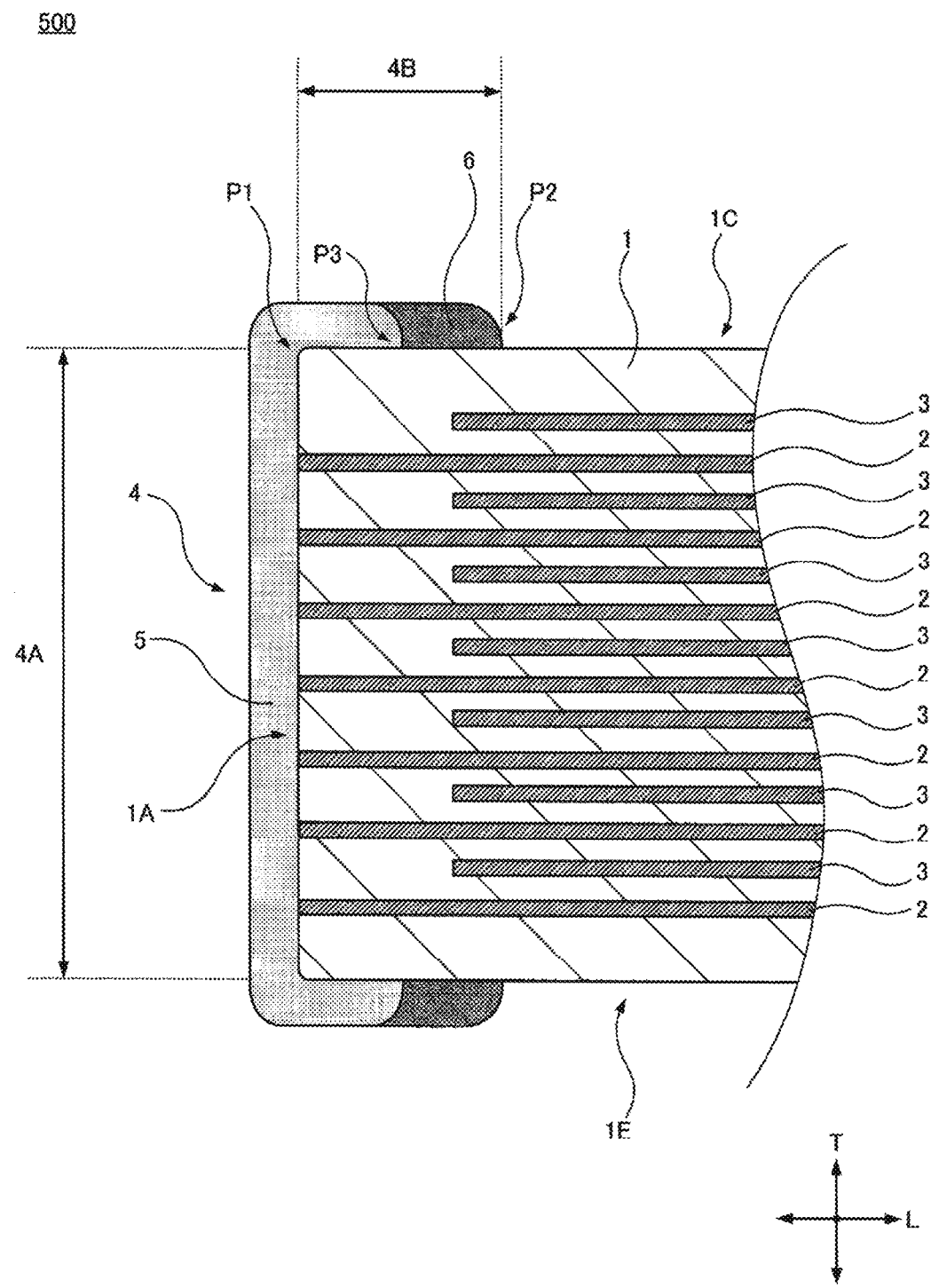
FIG. 8 is a cross section of a portion of a ceramic capacitor 500 according to a preferred embodiment of the present invention.

FIG. 8 shows a ceramic capacitor 500 as a ceramic electronic component according to a fifth preferred embodiment of the present invention. FIG. 8 is a cross section of a portion of ceramic capacitor 500. FIG. 8 does not show Ni and Sn plating layers 7 and 8 on external electrode 4.

Ceramic capacitor 500 includes external electrode 4 such that end surface region 4A includes a single layer of high glass content layer 5, side surface region 4B from first end portion P1 to intermediate point P3 includes a single layer of high glass content layer 5, and side surface region 4B from intermediate point P3 to second end portion P2 includes a single layer of low glass content layer 6.

Ceramic capacitor 500 can include external electrode 4 formed, for example, in the following non-limiting example method. Initially, the second conductive paste is applied to an end portion of ceramic body 1 in the shape of a cap and dried. Subsequently, on a side surface of ceramic body 1, the third conductive paste is annularly applied so as to be electrically connected to an end of the applied and dried second conductive paste, and is dried. Subsequently, the second and third conductive pastes are baked to ceramic body 1. Thus, external electrode 4 is formed.

Ceramic capacitor 500 includes external electrode 4 including side surface region 4B that include low glass content layer 6 in a region from intermediate point P3 to second end portion P2, and even when a substrate with the ceramic capacitor mounted thereon is warped, flexed or the like, low glass content layer 6 is peeled off ceramic body 1 and thus relaxes stress, and side surfaces 1C, 1D, 1E, 1F of the ceramic body are less likely to be cracked. In addition, ceramic capacitor 500 includes internal electrodes 2 and 3 led out in end surface region 4A of external electrode 4 that includes high glass content layer 5, and the ceramic capacitor is thus resistant to intrusion of moisture and has high moisture resistance. Further, ceramic capacitor 500 includes external electrode 4 including side surface region 4B with a portion thereof that extends from intermediate point P3 to second end portion P2, of low glass content layer 6, and side surface region 4B thus has high platability and high solder wettability.

Sixth Preferred Embodiment

Figure 9:
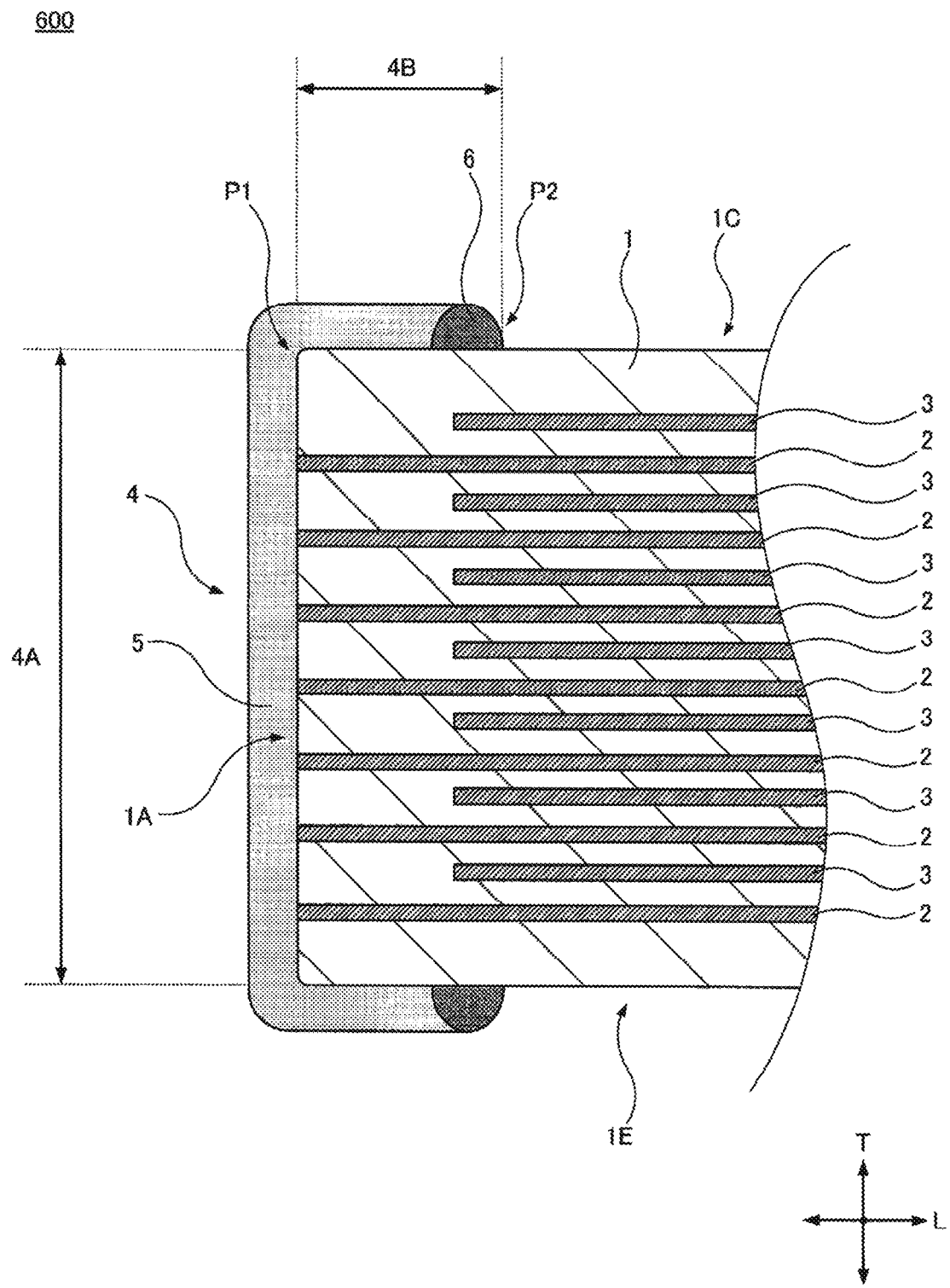
FIG. 9 is a cross section of a portion of a ceramic capacitor 600 according to a preferred embodiment of the present invention.

FIG. 9 shows a ceramic capacitor 600 as a ceramic electronic component according to a sixth preferred embodiment of the present invention. FIG. 9 is a cross section of a portion of ceramic capacitor 600. FIG. 9 does not show Ni and Sn plating layers 7 and 8 on external electrode 4.

Ceramic capacitor 600 includes external electrode 4 such that end surface region 4A includes a single layer of high glass content layer 5 and side surface region 4B includes second end portion P2 and a vicinity thereof including a single layer of low glass content layer 6 and includes a remaining portion including a single layer of high glass content layer 5.

Ceramic capacitor 600 can include external electrode 4 formed, for example, in the following non-limiting example method. Initially, the third conductive paste is annularly applied to side surfaces 1C to 1F spaced from end surface 1A (1B) of ceramic body 1, as prescribed, and is dried. Subsequently, the second conductive paste is applied to an end portion of ceramic body 1 in the shape of a cap so as to be electrically connected to the applied and dried third conductive paste, and is dried. Subsequently, the third and second conductive pastes are baked to ceramic body 1. Thus, external electrode 4 is formed.

Ceramic capacitor 600 includes external electrode 4 including side surface region 4B with second end portion P2 and a vicinity thereof of low glass content layer 6, and even when a substrate with the ceramic capacitor mounted thereon is warped, flexed or the like, low glass content layer 6 is peeled off ceramic body 1 and thus relaxes stress, and side surfaces 1C, 1D, 1E, 1F of ceramic body 1 are less likely to be cracked. In addition, ceramic capacitor 600 includes internal electrodes 2 and 3 led out in end surface region 4A of external electrode 4 that includes high glass content layer 5, and the ceramic capacitor is thus resistant to intrusion of moisture and has high moisture resistance. Further, ceramic capacitor 600 includes external electrode 4 including side surface region 4B with second end portion P2 and a vicinity thereof of low glass content layer 6, and thus having high platability and high solder wettability.

Seventh Preferred Embodiment

Figure 10:
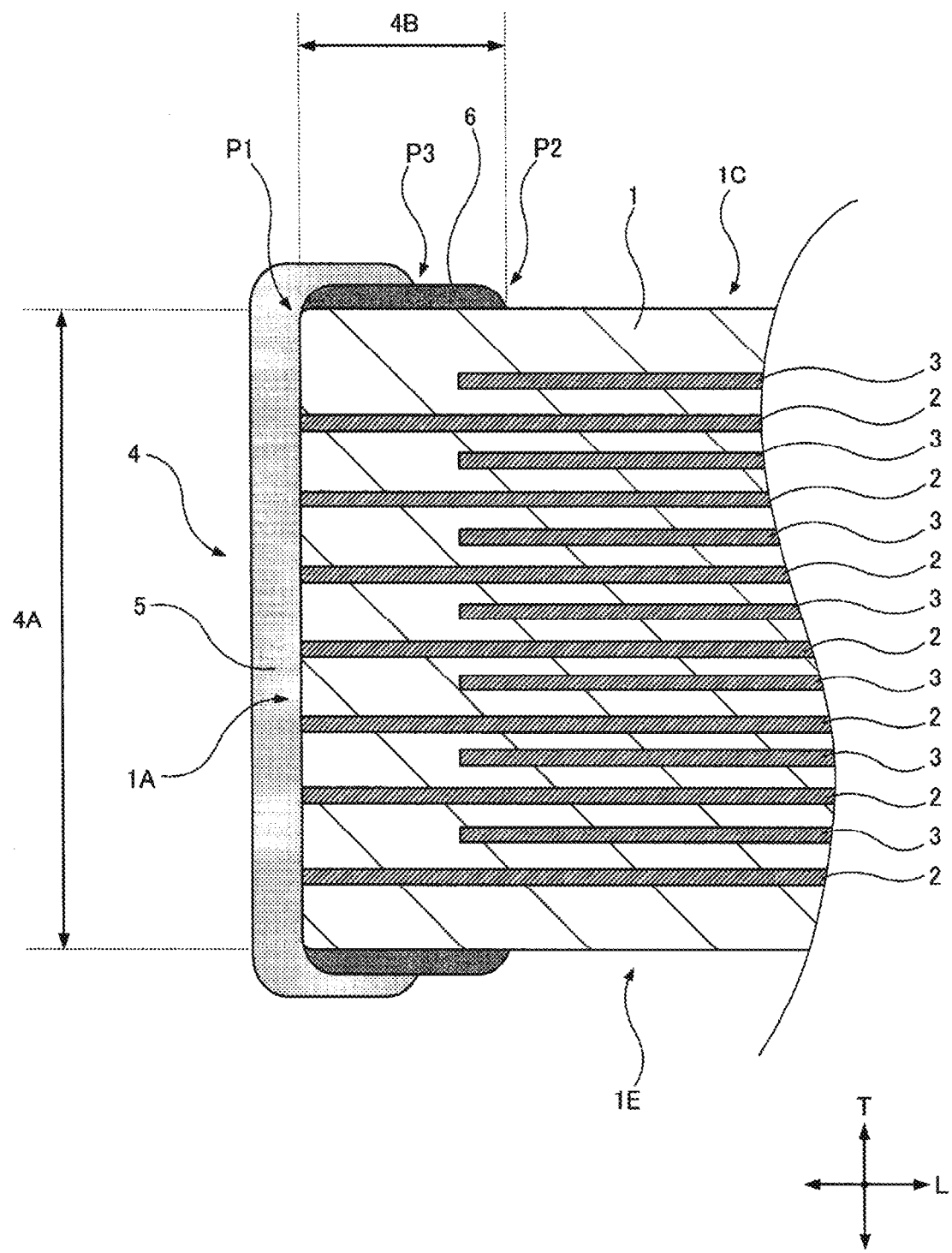
FIG. 10 is a cross section of a portion of a ceramic capacitor 700 according to a preferred embodiment of the present invention.

FIG. 10 shows a ceramic capacitor 700 as a ceramic electronic component according to a seventh preferred embodiment of the present invention. FIG. 10 is a cross section of a portion of ceramic capacitor 700. FIG. 10 does not show Ni and Sn plating layers 7 and 8 on external electrode 4.

Ceramic capacitor 700 includes external electrode 4 such that end surface region 4A includes a single layer of high glass content layer 5, side surface region 4B from first end portion P1 to intermediate point P3 includes two layers of a lower layer of low glass content layer 6 and an upper layer of high glass content layer 5, and side surface region 4B from intermediate point P3 to second end portion P2 includes a single layer of low glass content layer 6.

Ceramic capacitor 700 can include external electrode 4 formed, for example, in the following non-limiting example method. Initially, the third conductive paste is annularly applied to ceramic body 1 on side surfaces 1C, 1D, 1E, and 1F to have a fixed width in contact with end surface 1A (1B), and dried. Subsequently, the second conductive paste is applied to ceramic body 1 at an end portion in the shape of a cap so as to partially overlap the applied and dried third conductive paste, and dried. Subsequently, the third and second conductive pastes are baked to ceramic body 1. Thus, external electrode 4 is formed.

Ceramic capacitor 700 includes external electrode 4 including side surface region 4B with a portion thereof that is in contact with ceramic body 1, of low glass content layer 6, and even when a substrate with the ceramic capacitor mounted thereon is warped, flexed or the like, low glass content layer 6 is peeled off ceramic body 1 and thus relaxes stress, and side surfaces 1C, 1D, 1E, 1F of ceramic body 1 are less likely to be cracked. In addition, ceramic capacitor 700 includes internal electrodes 2 and 3 led out in end surface region 4A of external electrode 4 that includes high glass content layer 5, and the ceramic capacitor is thus resistant to intrusion of moisture and has high moisture resistance. Further, ceramic capacitor 500 includes external electrode 4 including side surface region 4B such that a portion thereof extending from intermediate point P3 to second end portion P2 includes low glass content layer 6 exposed, and at that portion, side surface region 4B has high platability and high solder wettability.

Thus, the ceramic capacitors according to the preferred embodiments described above all include an external electrode including a side surface region including at least a portion with a surface exposing a low glass content layer.

The side surface region of the external electrode of the ceramic electronic component is an important portion to obtain large soldering strength, and if this portion has low solder wettability, the ceramic electronic component cannot be firmly mounted on a substrate.

For example, the conventional ceramic electronic component disclosed in Japanese Patent Laid-Open No. 2005-217128 includes an external electrode including a side surface region including a surface entirely exposing a high glass content layer, and thus having low platability and low solder wettability. Therefore, when the ceramic electronic component is soldered to and thus mounted on a substrate, the ceramic electronic component may not have the external electrode firmly soldered to a land electrode of the substrate.

A ceramic electronic component according to a preferred embodiment of the present invention includes an external electrode including a side surface region with at least a portion thereof including a surface with a low glass content layer exposed, and at that portion, the external electrode includes the side surface region with high platability and high solder wettability. The ceramic electronic component according to the present preferred embodiment enables the external electrode to be firmly soldered to the land electrode of the substrate.

Further, a ceramic electronic component according to a preferred embodiment of the present invention includes an external electrode including a side surface region at least with a second end portion and a vicinity thereof including a low glass content layer in contact with a ceramic body, and when it is soldered and thus mounted on a substrate, and the substrate is warped, flexed or the like, the low glass content layer of that portion can peel off the ceramic body and thus relax stress and reduce cracking in a side surface of the ceramic body.

In addition, a ceramic electronic component according to a preferred embodiment of the present invention includes an external electrode including an end surface region such that at at least a portion where the internal electrode is led out the end surface region includes a high glass content layer in contact with the ceramic body, and the ceramic electronic component is thus resistant to intrusion of moisture and has high moisture resistance.

A ceramic capacitor (a ceramic electronic component) has been described in the preferred embodiments of the present invention. However, the present invention is not limited to the contents described above, and various modifications can be made in accordance with the gist of the present invention.

For example, while a ceramic capacitor has been described as an example of a ceramic electronic component according to a preferred embodiment of the present invention, ceramic electronic component according to preferred embodiments of the present invention and modifications thereof may be of any type and is not limited to a ceramic capacitor. The ceramic electronic components according to preferred embodiments of the present invention and modifications thereof may be another type of ceramic electronic component such as, for example, a ceramic inductor, a ceramic LC composite component, a ceramic thermistor, or a ceramic resistor.

A ceramic electronic component according to a preferred embodiment of the present invention is as described in the "SUMMARY OF THE INVENTION" section.

In such a ceramic electronic component, it is also preferable that at least one plating layer is provided on a surface of the external electrode. In this case, the ceramic electronic component can include the external electrode with improved heat resistance, solderability, and the like.

Further, it is also preferable that the high glass content layer has a glass content larger by about 10% by volume or more than that of the low glass content layer, for example. In this case, the high glass content layer can be firmly bonded to the ceramic body.

The external electrode can include an end surface region including a single high glass content layer and a side surface region including a single low glass content layer.

Further, the external electrode can include an end surface region including a single high glass content layer, and a side surface region including a portion that extends from a first end portion to an intermediate point that includes multiple layers including a lower layer of the high glass content layer and an upper layer of the low glass content layer, and a portion that extends from the intermediate point to a second end portion that includes a single low glass content layer.

Further, the external electrode can include an end surface region that includes multiple layers including a lower layer of the high glass content layer and an upper layer of the low glass content layer, and a side surface region of a single low glass content layer.

Further, the external electrode can include an end surface region that includes multiple layers including a lower layer of a high glass content layer and an upper layer of a low glass content layer, and a side surface region including a portion thereof that extends from a first end portion to an intermediate point, that includes multiple layers including a lower layer of the high glass content layer and an upper layer of the low glass content layer, and a portion thereof that extends from the intermediate point to a second end portion that includes a single low glass content layer.

Further, the external electrode can include an end surface region including a single high glass content layer, and a side surface region including a portion thereof that extends from a first end portion to an intermediate point that includes a single high glass content layer, and a portion thereof that extends from the intermediate point to a second end portion that includes a single low glass content layer.

Further, the external electrode can include an end surface region including a single high glass content layer, and a side surface region including a second end portion and a vicinity thereof of a single low glass content layer, and a remaining portion thereof of a single high glass content layer.

Further, the external electrode can include an end surface region of a single high glass content layer, and a side surface region including a portion that extends from a first end portion to an intermediate point that includes multiple layers of a lower layer of a low glass content layer and an upper layer of a high glass content layer, and a portion that extends from the intermediate point to a second end portion that includes a single low glass content layer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a ceramic body including a ceramic layer and an internal electrode stacked in layers; and
   at least one external electrodes on a surface of the ceramic body; wherein
   the internal electrode and the at least one external electrode are electrically interconnected;
   the ceramic body includes a pair of end surfaces at which the internal electrode is led out, and four side surfaces connecting the pair of end surfaces;
   the at least one external electrode includes at least a high glass content layer including glass and a low glass content layer including glass at a ratio smaller than the high glass content layer; and
   in at least one of a cross section including the at least one external electrode that is obtained by cutting in a direction perpendicular or substantially perpendicular to a direction of a plane in which the internal electrode extends and a cross section including the at least one external electrode that is obtained by cutting in a direction parallel or substantially parallel to the direction of the plane in which the internal electrode extends:
      the at least one external electrode includes an end surface region on at least one of the pair of end surfaces and a side surface region on at least one of the four side surfaces;
      the side surface region includes a first end portion electrically connected to the end surface region at a ridge portion of the ceramic body connecting the at least one end surface and the at least one side surface together, and a second end portion opposite to the first end portion;
      at at least a portion where the internal electrode is led out, the end surface region includes the high glass content layer in contact with the ceramic body;
      at least the second end portion and a vicinity thereof includes the low glass content layer in contact with the ceramic body; and
      at least a portion of the side surface region includes a surface with the low glass content layer exposed.

2. The ceramic electronic component according to claim 1, wherein at least one plating layer is provided on a surface of the at least one external electrode.

3. The ceramic electronic component according to claim 1, wherein the high glass content layer has a glass content larger by about 10% by volume or more than that of the low glass content layer.

4. The ceramic electronic component according to claim 1, wherein
the end surface region includes a single layer of the high glass content layer; and
the side surface region includes a single layer of the low glass content layer.

5. The ceramic electronic component according to claim 1, wherein
the end surface region includes a single layer of the high glass content layer; and
the side surface region includes:
a portion extending from the first end portion to an intermediate point that includes multiple layers including a lower layer of the high glass content layer and an upper layer of the low glass content layer; and
a portion extending from the intermediate point to the second end portion that includes a single layer of the low glass content layer.

6. The ceramic electronic component according to claim 1, wherein
the end surface region includes multiple layers including a lower layer of the high glass content layer and an upper layer of the low glass content layer; and
the side surface region includes a single layer of the low glass content layer.

7. The ceramic electronic component according to claim 1, wherein
the end surface region includes multiple layers including a lower layer of the high glass content layer and an upper layer of the low glass content layer; and
the side surface region includes:
a portion extending from the first end portion to an intermediate point that includes multiple layers including a lower layer of the high glass content layer and an upper layer of the low glass content layer; and
a portion extending from the intermediate point to the second end portion that includes a single layer of the low glass content layer.

8. The ceramic electronic component according to claim 1, wherein
the end surface region includes a single layer of the high glass content layer; and
the side surface region includes:
a portion extending from the first end portion to an intermediate point that includes a single layer of the high glass content layer; and
a portion extending from the intermediate point to the second end portion that includes a single layer of the low glass content layer.

9. The ceramic electronic component according to claim 1, wherein
the end surface region includes a single layer of the high glass content layer;
the second end portion of the side surface region and a vicinity thereof includes a single layer of the low glass content layer; and
a remaining portion of the side surface region includes a single layer of the high glass content layer.

10. The ceramic electronic component according to claim 1, wherein
the end surface region includes a single layer of the high glass content layer; and
the side surface region includes:
a portion extending from the first end portion to an intermediate point that includes multiple layers including a lower layer of the low glass content layer and an upper layer of the high glass content layer; and
a portion extending from the intermediate point to the second end portion that includes a single layer of the low glass content layer.

11. A method for manufacturing a ceramic electronic component including a ceramic body including a ceramic layer and an internal electrode stacked in layers, and an external electrode on a surface of the ceramic body, wherein the internal electrode and the external electrode are electrically interconnected, the ceramic body includes a pair of end surfaces at which the internal electrode is led out, and four side surfaces connecting the pair of end surfaces, the external electrode includes at least a high glass content layer including glass and a low glass content layer including glass at a ratio smaller than the high glass content layer, in at least one of a cross section obtained by cutting in a direction perpendicular or substantially perpendicular to a direction of a plane in which the internal electrode extends and a cross section obtained by cutting in a direction parallel or substantially parallel to the direction of the plane in which the internal electrode extends, the external electrode includes an end surface region on at least one of the pair of end surfaces and a side surface region on at least one of the four side surfaces, the side surface region includes a first end portion electrically connected to the end surface region at a ridge portion of the ceramic body connecting the at least one of the pair of end surfaces and the at least one of the four side surfaces together, and a second end portion opposite to the first end portion, at at least a portion where the internal electrode is led out, the end surface region includes the high glass content layer in contact with the ceramic body, and at least the second end portion of the side surface region and a vicinity thereof includes the low glass content layer in contact with the ceramic body, the method comprising:
preparing a ceramic body including the ceramic layer and the internal electrode stacked in layers, the preparing including:
preparing a plurality of ceramic green sheets;
applying a first conductive paste to a major surface of at least one of the plurality of ceramic green sheets;
stacking the plurality of ceramic green sheets in layers to prepare a green ceramic body; and
firing the green ceramic body; and
applying second and third conductive pastes to a surface of the fired ceramic body and firing the second and third conductive pastes on the surface of the ceramic body to form the external electrode.

12. The method for manufacturing a ceramic electronic component according to claim 11, further comprising forming at least one plating layer on a surface of the external electrode.

13. The method for manufacturing a ceramic electronic component according to claim 11, wherein the high glass content layer has a glass content larger by about 10% by volume or more than that of the low glass content layer.

14. The method for manufacturing a ceramic electronic component according to claim 11, wherein
the end surface region includes a single layer of the high glass content layer; and
the side surface region includes a single layer of the low glass content layer.

15. The method for manufacturing a ceramic electronic component according to claim 11, wherein
the end surface region includes a single layer of the high glass content layer; and
the side surface region includes:
a portion extending from the first end portion to an intermediate point that includes multiple layers including a lower layer of the high glass content layer and an upper layer of the low glass content layer; and
a portion extending from the intermediate point to the second end portion that includes a single layer of the low glass content layer.

16. The method for manufacturing a ceramic electronic component according to claim 11, wherein
the end surface region includes multiple layers including a lower layer of the high glass content layer and an upper layer of the low glass content layer; and
the side surface region includes a single layer of the low glass content layer.

17. The method for manufacturing a ceramic electronic component according to claim 11, wherein
the end surface region includes multiple layers including a lower layer of the high glass content layer and an upper layer of the low glass content layer; and
the side surface region includes:
a portion extending from the first end portion to an intermediate point that includes multiple layers including a lower layer of the high glass content layer and an upper layer of the low glass content layer; and
a portion extending from the intermediate point to the second end portion that includes a single layer of the low glass content layer.

18. The method for manufacturing a ceramic electronic component according to claim 11, wherein
the end surface region includes a single layer of the high glass content layer; and
the side surface region includes:
a portion extending from the first end portion to an intermediate point that includes a single layer of the high glass content layer; and
a portion extending from the intermediate point to the second end portion that includes a single layer of the low glass content layer.

19. The method for manufacturing a ceramic electronic component according to claim 11, wherein
the end surface region includes a single layer of the high glass content layer;
the second end portion of the side surface region and a vicinity thereof includes a single layer of the low glass content layer; and
a remaining portion of the side surface region includes a single layer of the high glass content layer.

20. The method for manufacturing a ceramic electronic component according to claim 11, wherein
the end surface region includes a single layer of the high glass content layer; and
the side surface region includes:
a portion extending from the first end portion to an intermediate point that includes multiple layers including a lower layer of the low glass content layer and an upper layer of the high glass content layer; and
a portion extending from the intermediate point to the second end portion that includes a single layer of the low glass content layer.

* * * * *